(12) United States Patent
Yonezawa et al.

(10) Patent No.: US 11,247,664 B2
(45) Date of Patent: Feb. 15, 2022

(54) HYBRID VEHICLE AND METHOD OF CONTROLLING HYBRID VEHICLE

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 16/819,928

(22) Filed: Mar. 16, 2020

(65) Prior Publication Data

US 2020/0307548 A1 Oct. 1, 2020

(30) Foreign Application Priority Data

Mar. 25, 2019 (JP) .............................. JP2019-056374

(51) Int. Cl.
*B60W 20/40* (2016.01)
*B60W 10/08* (2006.01)
(Continued)

(52) U.S. Cl.
CPC ............ *B60W 20/40* (2013.01); *B60W 10/06* (2013.01); *B60W 10/08* (2013.01); *B60W 20/10* (2013.01); *B60W 2510/1085* (2013.01)

(58) Field of Classification Search
CPC ...... B60W 20/40; B60W 20/10; B60W 20/15; B60W 20/00; B60W 10/08; B60W 10/06;
(Continued)

(56) References Cited

U.S. PATENT DOCUMENTS

| 6,568,186 | B2 * | 5/2003 | Zaleski | ................... F01B 17/02 |
| | | | | 60/39.6 |
| 2010/0314186 | A1 * | 12/2010 | Ma | .......................... F02B 29/00 |
| | | | | 180/165 |

(Continued)

FOREIGN PATENT DOCUMENTS

| CN | 203532051 U | 4/2014 |
| CN | 106762103 A | 5/2017 |
| JP | 2015-058924 A | 3/2015 |

*Primary Examiner* — George C Jin
(74) *Attorney, Agent, or Firm* — Sughrue Mion, PLLC

(57) ABSTRACT

An HV-ECU performs processing including controlling an engine to be in a non-forced induction operation state when an engine has been on and when an engine stop request has been issued, performing processing for stopping the engine when a predetermined first period has elapsed, restricting forced induction and output when the engine stop request has not been issued and when a current time point is immediately after start of the engine, canceling restriction when a predetermined second period has elapsed, and controlling the engine with a position on a higher rotation speed side than a current operating point along an equal power line being set as an operating point when the current time point is not immediately after start of the engine and when a negative pressure is insufficient.

7 Claims, 6 Drawing Sheets

(51) Int. Cl.
*B60W 10/06* (2006.01)
*B60W 20/10* (2016.01)

(58) Field of Classification Search
CPC . B60W 2510/1085; B60W 2710/0683; B60W 2710/0638; B60W 2710/083; B60K 6/24; B60K 6/445; G02B 37/183; G02B 37/186
See application file for complete search history.

(56) References Cited

U.S. PATENT DOCUMENTS

| | | | |
|---|---|---|---|
| 2016/0272186 A1* | 9/2016 | Luehrsen | F02D 41/042 |
| 2017/0145933 A1 | 5/2017 | Dudar | |
| 2018/0106188 A1* | 4/2018 | So | F02B 37/183 |
| 2018/0142613 A1* | 5/2018 | Kurauchi | F02B 37/183 |
| 2020/0307548 A1* | 10/2020 | Yonezawa | B60K 6/24 |

* cited by examiner

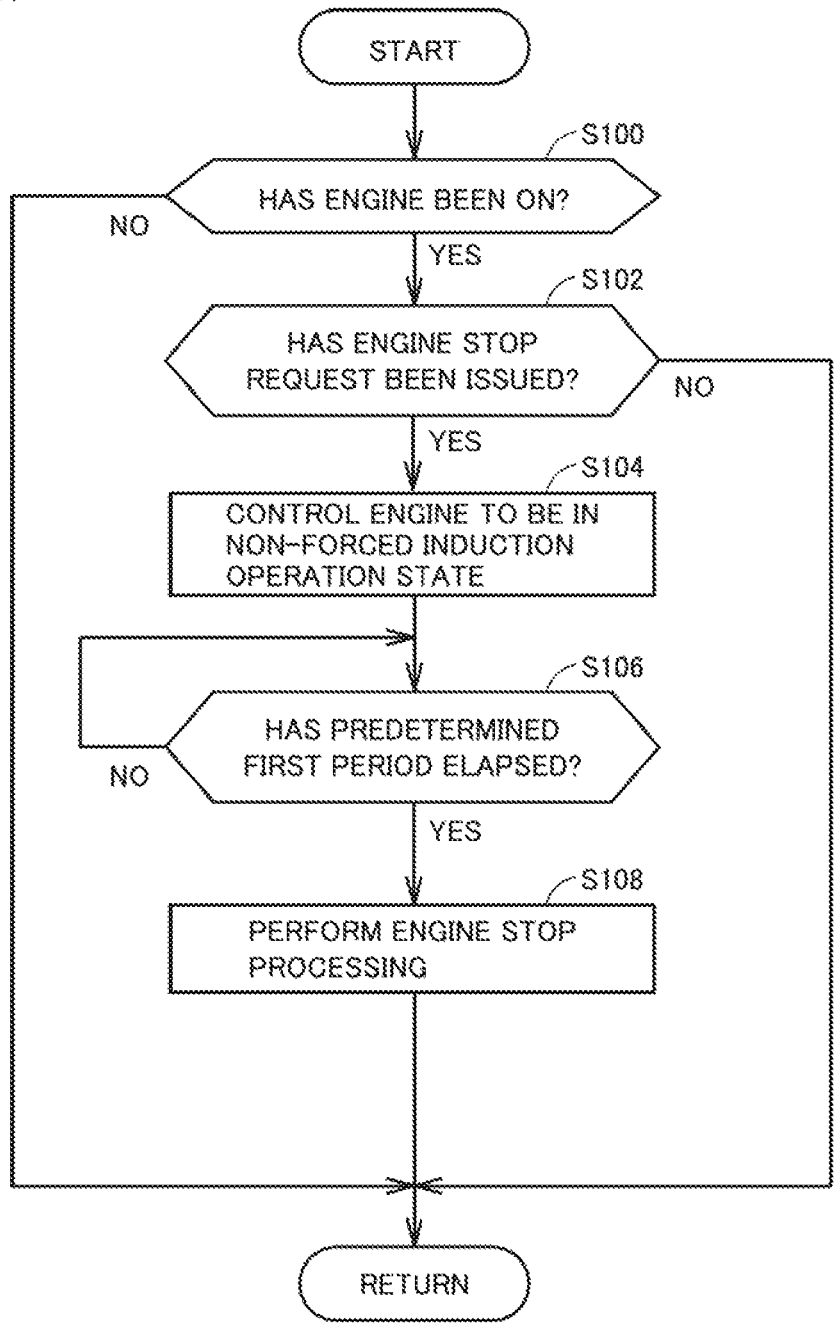

HYBRID VEHICLE AND METHOD OF CONTROLLING HYBRID VEHICLE

This nonprovisional application is based on Japanese Patent Application No. 2019-056374 filed with the Japan Patent Office on Mar. 25, 2019, the entire contents of which are hereby incorporated by reference.

BACKGROUND

Field

The present disclosure relates to control of a hybrid vehicle incorporating a motor and an engine including a turbo charger as drive sources.

Description of the Background Art

A hybrid vehicle that incorporates a motor and an engine as drive sources, includes a power storage charged with motive power of the engine, and runs with motive power of the engine has conventionally been known. Some engines mounted on such a hybrid vehicle include a turbo charger.

For example, Japanese Patent Laying-Open No. 2015-58924 discloses a hybrid vehicle incorporating a motor and an engine including a turbo charger.

SUMMARY

In the hybrid vehicle described above, a waste gate valve that is operated by a negative pressure generated by an operation of the engine is employed for regulating a boost pressure of the turbo charger. When a vacuum pump that generates a negative pressure with motive power of the engine is employed as a negative pressure source, however, cost and a mass increase due to increase in number of components and ease in mounting other components may be lessened. Alternatively, a negative pressure in an air intake pipe of the engine may be made use of, however, a positive pressure may be produced in the air intake pipe due to increase in boost pressure in the engine including the turbo charger. In such a case, a negative pressure for operating the waste gate valve may not be generated.

An object of the present disclosure is to provide a hybrid vehicle that ensures a negative pressure for operating a negative-pressure-driven waste gate valve at appropriate timing while increase in cost or weight is suppressed and a method of controlling a hybrid vehicle.

A hybrid vehicle according to one aspect of the present disclosure includes an engine including a turbo charger, the engine transmitting motive power to a drive wheel of the vehicle, a motor generator for driving that transmits motive power to the drive wheel, and a controller that selectively carries out first running control under which the vehicle runs using the engine and second running control under which the vehicle runs using the motor generator for driving with the engine being stopped. The engine includes a bypass passage provided in an exhaust passage through which exhaust flows by bypassing a turbine of the turbo charger, a waste gate valve that regulates a flow rate of exhaust in the bypass passage, and a driver that drives the waste gate valve. The driver includes a negative pressure tank to which a negative pressure can be supplied from an intake air passage of the engine, a valve that suppresses a flow of gas from the intake air passage to the negative pressure tank, and a negative pressure actuator that actuates the waste gate valve with the negative pressure in the negative pressure tank. When stop of the engine is requested during the first running control, the controller controls the engine to continue a non-forced induction operation state in which forced induction by the turbo charger is restricted until a first period elapses before stop of the engine.

By thus restricting forced induction by the turbo charger, the negative pressure tank can be set to a prescribed negative pressure state by the time the engine is stopped. Therefore, even though forced induction by the turbo charger is performed after re-start of the engine, the waste gate valve can be activated. Consequently, the turbo charger can be set to an appropriate forced induction state. Since a component such as a vacuum pump is not used, increase in cost or weight can be suppressed.

In one embodiment, the controller continues the non-forced induction operation state until a second period elapses since start of the engine.

By doing so, the negative pressure tank can be set to a prescribed negative pressure state by restriction of forced induction by the turbo charger until the second period elapses since start of the engine. Therefore, even though forced induction by the turbo charger is thereafter performed, the waste gate valve can be activated. Consequently, the turbo charger can be set to an appropriate forced induction state.

Furthermore, in one embodiment, the controller compensates for shortage in driving force of the vehicle caused by continuation of the non-forced induction operation state, by using the motor generator for driving.

By doing so, shortage in driving force of the vehicle due to restriction of forced induction by the turbo charger is compensated for by the motor generator for driving. Therefore, deterioration in drivability of the vehicle can be suppressed.

Furthermore, in one embodiment, the non-forced induction operation state includes a state that the waste gate valve is opened to opening equal to or greater than threshold opening.

By doing so, the waste gate valve is opened to opening equal to or greater than threshold opening and therefore forced induction by the turbo charger is restricted. The engine is thus set to a normal aspiration state and a negative pressure can be produced in the intake air passage.

Furthermore, in one embodiment, the non-forced induction operation state includes a state that an upper limit value of engine torque is lower than a lower limit value of a range of engine torque, forced induction by the turbo charger being performed in the range.

By doing so, engine torque is controlled not to exceed the upper limit value and therefore forced induction by the turbo charger is restricted. The engine is thus set to a normal aspiration state and a negative pressure can be produced in the intake air passage.

Furthermore, in one embodiment, the hybrid vehicle further includes a motor generator for power generation that generates electric power by using motive power of the engine and a power divider that divides motive power output from the engine into motive power to be transmitted to the motor generator for power generation and motive power to be transmitted to the drive wheel. When a negative pressure is insufficient in the negative pressure tank, the controller controls the engine and the motor generator for power generation to change an operating point of the engine toward a higher rotation speed side with output from the engine being maintained and operates the engine at the changed operating point.

By doing so, the operating point is changed toward the higher rotation speed side with output from the engine being maintained. Engine torque can thus be lowered with engine power being maintained. Therefore, forced induction by the turbo charger is restricted. The engine is thus set to a normal aspiration state and a negative pressure can be produced in the intake air passage.

A method of controlling a hybrid vehicle according to another aspect of the present disclosure is a method of controlling a hybrid vehicle, the hybrid vehicle including an engine including a turbo charger and a motor generator for driving; the engine transmitting motive power to a drive wheel of the vehicle; the motor generator transmitting motive power to the drive wheel. The engine includes a bypass passage provided in an exhaust passage through which exhaust flows by bypassing a turbine of the turbo charger, a waste gate valve that regulates a flow rate of exhaust in the bypass passage, and a driver that drives the waste gate valve. The driver includes a negative pressure tank to which a negative pressure can be supplied from an intake air passage of the engine, a valve that suppresses a flow of gas from the intake air passage to the negative pressure tank, and a negative pressure actuator that actuates the waste gate valve with the negative pressure in the negative pressure tank. The method includes selectively carrying out first running control under which the vehicle runs using the engine and second running control under which the vehicle runs using the motor generator for driving with the engine being stopped, and controlling, when stop of the engine is requested during the first running control, the engine to continue a non-forced induction operation state until a first period elapses before stop of the engine, forced induction by the turbo charger being restricted in the non-forced induction operation state.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a flowchart showing exemplary processing performed by the HV-ECU in the modification.

DESCRIPTION OF THE PREFERRED EMBODIMENTS

Figure 1:
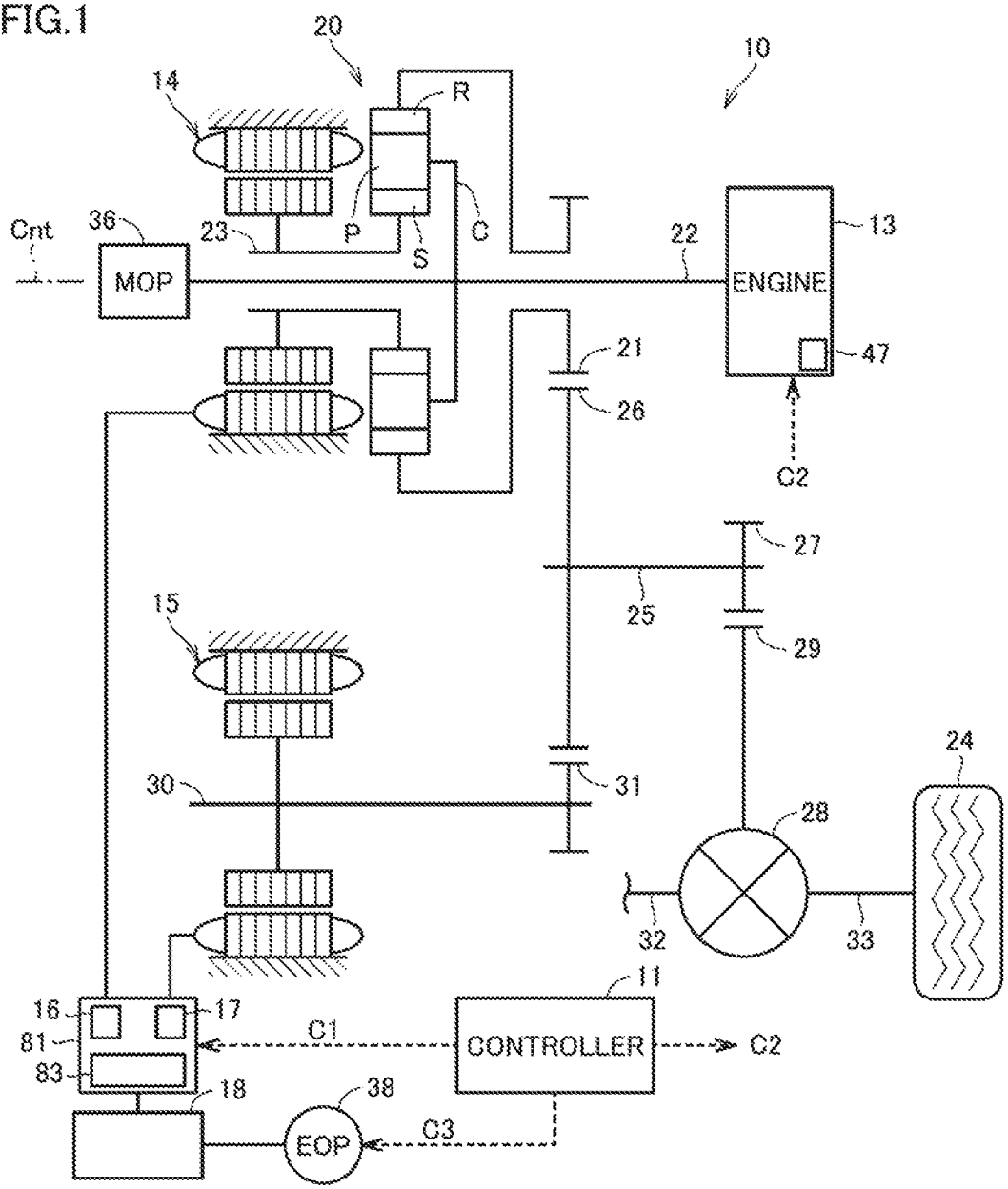
FIG. 1 is a diagram showing an exemplary configuration of a drive system of a hybrid vehicle.

An embodiment of the present disclosure will be described in detail below with reference to the drawings. The same or corresponding elements in the drawings have the same reference characters allotted and description thereof will not be repeated.

As to Drive System of Hybrid Vehicle

FIG. 1 is a diagram showing an exemplary configuration of a drive system of a hybrid vehicle (which is simply denoted as a vehicle below) 10. As shown in FIG. 1, vehicle 10 includes as a drive system, a controller 11 as well as an engine 13, a first motor generator (which is denoted as a first MG below) 14, and a second motor generator (which is denoted as a second MG below) 15 that serve as motive power sources for running. Engine 13 includes a turbo charger 47. First MG 14 and second MG 15 each perform a function as a motor that outputs torque by being supplied with driving electric power and a function as a generator that generates electric power by being supplied with torque. An alternating current (AC) rotating electric machine is employed for first MG 14 and second MG 15. The AC rotating electric machine includes, for example, a permanent magnet synchronous motor including a rotor having a permanent magnet embedded.

First MG 14 and second MG 15 are electrically connected to a battery 18 with a power control unit (PCU) 81 being interposed. PCU 81 includes a first inverter 16 that supplies and receives electric power to and from first MG 14, a second inverter 17 that supplies and receives electric power to and from second MG 15, battery 18, and a converter 83 that supplies and receives electric power to and from first inverter 16 and second inverter 17.

For example, converter 83 can up-convert electric power from battery 18 and supply up-converted electric power to first inverter 16 or second inverter 17. Alternatively, converter 83 can down-convert electric power supplied from first inverter 16 or second inverter 17 and supply down-converted electric power to battery 18.

First inverter 16 can convert direct current (DC) power from converter 83 into AC power and supply AC power to first MG 14. Alternatively, first inverter 16 can convert AC power from first MG 14 into DC power and supply DC power to converter 83.

Second inverter 17 can convert DC power from converter 83 into AC power and supply AC power to second MG 15. Alternatively, second inverter 17 can convert AC power from second MG 15 into DC power and supply DC power to converter 83.

PCU 81 charges battery 18 with electric power generated by first MG 14 or second MG 15 or drives first MG 14 or second MG 15 with electric power from battery 18.

Battery 18 includes, for example, a lithium ion secondary battery or a nickel metal hydride secondary battery. The lithium ion secondary battery is a secondary battery in which lithium is adopted as a charge carrier, and may include not only a general lithium ion secondary battery containing a liquid electrolyte but also what is called an all-solid-state battery containing a solid electrolyte. Battery 18 should only be a power storage that is at least rechargeable, and for example, an electric double layer capacitor may be employed instead of the secondary battery.

Engine 13 and first MG 14 are coupled to a planetary gear mechanism 20. Planetary gear mechanism 20 transmits drive torque output from engine 13 by dividing drive torque into drive torque to first MG 14 and drive torque to an output gear 21, and represents an exemplary power divider in the embodiment of the present disclosure. Planetary gear mechanism 20 includes a single-pinion planetary gear mechanism and is arranged on an axis Cnt coaxial with an output shaft 22 of engine 13.

Planetary gear mechanism 20 includes a sun gear S, a ring gear R arranged coaxially with sun gear S, a pinion gear P meshed with sun gear S and ring gear R, and a carrier C holding pinion gear P in a rotatable and revolvable manner. Output shaft 22 is coupled to carrier C. A rotor shaft 23 of first MG 14 is coupled to sun gear S. Ring gear R is coupled to output gear 21. Output gear 21 represents one of output elements for transmitting drive torque to a drive wheel 24.

In planetary gear mechanism 20, carrier C to which drive torque output from engine 13 is transmitted serves as an input element, ring gear R that outputs drive torque to output gear 21 serves as an output element, and sun gear S to which rotor shaft 23 is coupled serves as a reaction force element. Planetary gear mechanism 20 divides motive power output from engine 13 into motive power on a side of first MG 14 and motive power on a side of output gear 21. First MG 14 is controlled to output torque in accordance with an engine rotation speed.

A countershaft 25 is arranged in parallel to axis Cnt. Countershaft 25 is attached to a driven gear 26 meshed with output gear 21. A drive gear 27 is attached to countershaft 25, and drive gear 27 is meshed with a ring gear 29 in a differential gear 28 representing a final reduction gear. A drive gear 31 attached to a rotor shaft 30 in second MG 15 is meshed with driven gear 26. Therefore, drive torque output from second MG 15 is added to drive torque output from output gear 21 in a part of driven gear 26. Drive torque thus combined is transmitted to drive wheel 24 with driveshafts 32 and 33 extending laterally from differential gear 28 being interposed. As drive torque is transmitted to drive wheel 24, driving force is generated in vehicle 10.

A mechanical oil pump (which is denoted as an MOP below) 36 is provided coaxially with output shaft 22. MOP 36 delivers lubricating oil with a cooling function, for example, to planetary gear mechanism 20, first MG 14, second MG 15, and differential gear 28. Vehicle 10 further includes an electric oil pump (which is denoted as an EOP below) 38. EOP 38 is driven by electric power supplied from battery 18 when operation of engine 13 is stopped, and it delivers lubricating oil to planetary gear mechanism 20, first MG 14, second MG 15, and differential gear 28 in a manner the same as or similar to MOP 36.

As to Configuration of Engine

Figure 2:
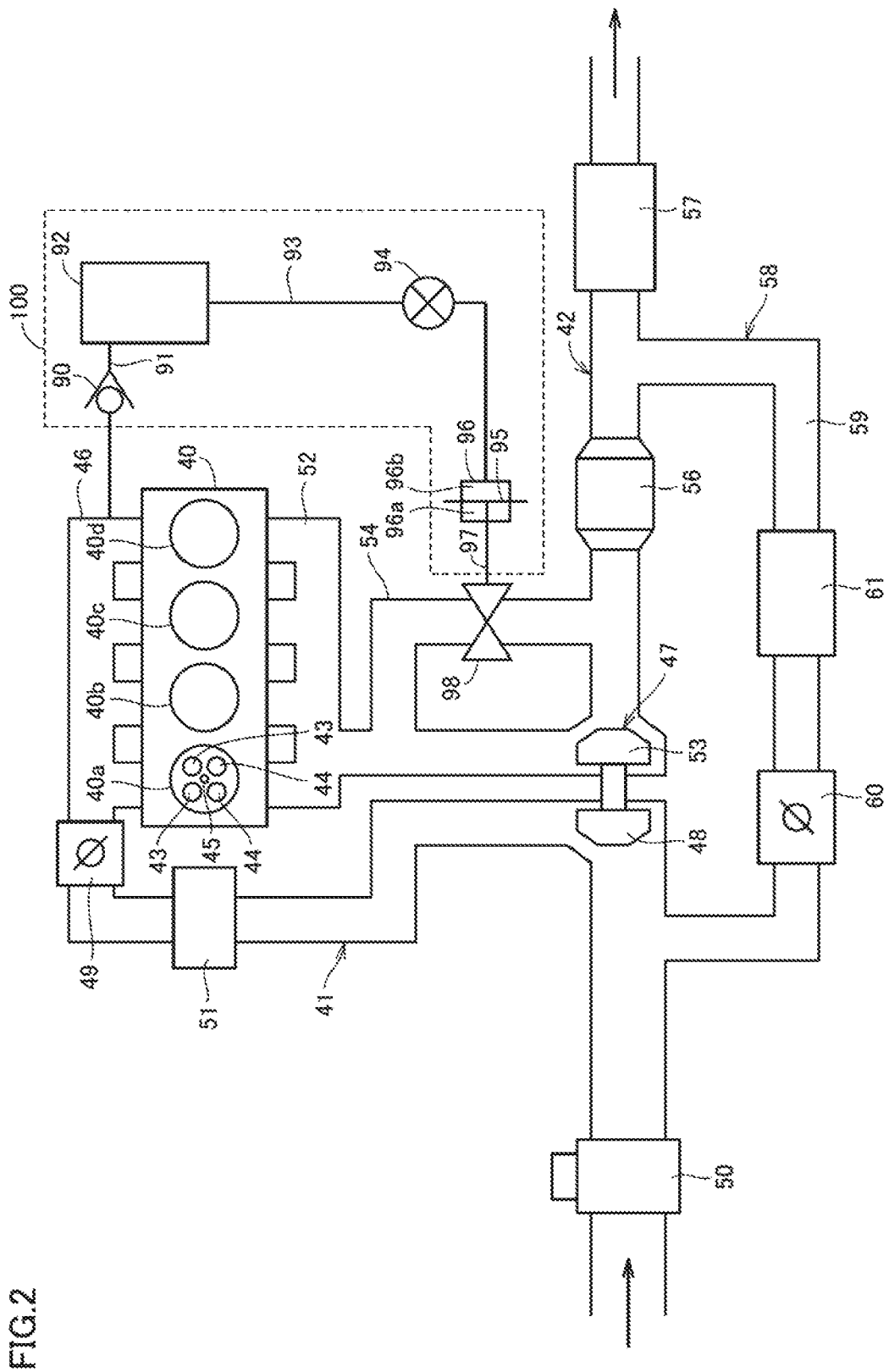
FIG. 2 is a diagram showing an exemplary configuration of an engine including a turbo charger.

FIG. 2 is a diagram showing an exemplary configuration of engine 13 including turbo charger 47. Engine 13 is, for example, an in-line four-cylinder spark ignition internal combustion engine. As shown in FIG. 2, engine 13 includes, for example, an engine main body 40 formed with four cylinders 40a, 40b, 40c, and 40d being aligned in one direction.

One ends of intake ports and one ends of exhaust ports formed in engine main body 40 are connected to cylinders 40a, 40b, 40c, and 40d. One end of the intake port is opened and closed by two intake valves 43 provided in each of cylinders 40a, 40b, 40c, and 40d, and one end of the exhaust port is opened and closed by two exhaust valves 44 provided in each of cylinders 40a, 40b, 40c and 40d. The other ends of the intake ports of cylinders 40a, 40b, 40c, and 40d are connected to an intake manifold 46. The other ends of the exhaust ports of cylinders 40a, 40b, 40c, and 40d are connected to an exhaust manifold 52.

In the present embodiment, engine 13 is, for example, a direct injection engine and fuel is injected into each of cylinders 40a, 40b, 40c, and 40d by a fuel injector (not shown) provided at the top of each cylinder. An air fuel mixture of fuel and intake air in cylinders 40a, 40b, 40c, and 40d is ignited by an ignition plug 45 provided in each of cylinders 40a, 40b, 40c, and 40d.

FIG. 2 shows intake valve 43, exhaust valve 44, and ignition plug 45 provided in cylinder 40a and does not show intake valve 43, exhaust valve 44, and ignition plug 45 provided in other cylinders 40b, 40c, and 40d.

Engine 13 is provided with turbo charger 47 that uses exhaust energy to boost suctioned air. Turbo charger 47 includes a compressor 48 and a turbine 53.

An intake air passage 41 has one end connected to intake manifold 46 and the other end connected to an air inlet. Compressor 48 is provided at a prescribed position in intake air passage 41. An air flow meter 50 that outputs a signal in accordance with a flow rate of air that flows through intake air passage 41 to controller 11 is provided between the other end (air inlet) of intake air passage 41 and compressor 48. An intercooler 51 that cools intake air pressurized by compressor 48 is disposed in intake air passage 41 provided downstream from compressor 48. An intake throttle valve (throttle valve) 49 that can regulate a flow rate of intake air that flows through intake air passage 41 is provided between intercooler 51 and one end of intake air passage 41.

An exhaust passage 42 has one end connected to exhaust manifold 52 and the other end connected to a muffler (not shown). Turbine 53 is provided at a prescribed position in exhaust passage 42. As turbine 53 is activated by exhaust, compressor 48 is activated in coordination with turbine 53. As a result of activation of compressor 48, intake air taken in through the air inlet is pressurized.

In exhaust passage 42, a bypass passage 54 that bypasses exhaust upstream from turbine 53 to a portion downstream from turbine 53 and a waste gate valve (which is denoted as WGV below) 98 provided in bypass passage 54 and capable of regulating a flow rate of exhaust guided to bypass passage 54 are provided. Therefore, a flow rate of exhaust that flows into turbine 53, that is, a boost pressure of suctioned air, is regulated by controlling opening of WGV 98.

Exhaust that passes through turbine 53 or WGV 98 is purified by a start-up converter 56 and an aftertreatment apparatus 57 provided at prescribed positions in exhaust passage 42, and thereafter emitted into the atmosphere. Aftertreatment apparatus 57 contains, for example, a three-way catalyst.

Engine 13 is provided with an exhaust gas recirculation (EGR) apparatus 58 that has exhaust flow into intake air passage 41. EGR apparatus 58 includes an EGR passage 59, an EGR valve 60, and an EGR cooler 61. EGR passage 59 allows some of exhaust to be taken out of exhaust passage 42 as EGR gas and guides EGR gas to intake air passage 41. EGR valve 60 regulates a flow rate of EGR gas that flows through EGR passage 59. EGR cooler 61 cools EGR gas that flows through EGR passage 59. EGR passage 59 connects a portion of exhaust passage 42 between start-up converter 56 and aftertreatment apparatus 57 to a portion of intake air passage 41 between compressor 48 and air flow meter 50.

As to Drive of WGV

Opening of WGV 98 is adjusted by a WGV driver 100. WGV driver 100 drives WGV 98 to open and close. WGV driver 100 is constituted of a check valve 90, a first pipe 91, a negative pressure tank 92, a second pipe 93, a negative pressure regulation valve 94, and a negative pressure actuator 96.

Negative pressure tank 92 has a prescribed volume and can accumulate a negative pressure with which negative pressure actuator 96 can be activated. Negative pressure tank 92 is coupled to intake manifold 46 through first pipe 91 and can receive supply of a negative pressure from intake manifold 46. Specifically, gas in negative pressure tank 92 is suctioned as a result of production of a negative pressure in intake manifold 46 so that a prescribed negative pressure state can be produced in negative pressure tank 92. Check valve 90 is provided in first pipe 91. Check valve 90 suppresses increase in pressure in negative pressure tank 92 due to flow of gas from intake manifold 46 into negative pressure tank 92. Negative pressure tank 92 is coupled to negative pressure actuator 96 through second pipe 93. Negative pressure regulation valve 94 is provided in second pipe 93. Negative pressure regulation valve 94 is an electromagnetic valve of which opening is continuously adjusted in accordance with a control signal from controller 11 and it regulates a negative pressure supplied by negative pressure tank 92 to negative pressure actuator 96.

Negative pressure actuator 96 operates WGV 98 by changing a position of a drive rod 97 with a negative pressure supplied by negative pressure tank 92 serving as a negative pressure source being used as a motive power source. Negative pressure actuator 96 is constituted of a diaphragm 95 provided in a housing, drive rod 97 having one end coupled to diaphragm 95, and an atmospheric chamber 96a and a negative pressure chamber 96b defined by partition by diaphragm 95 of the housing of negative pressure actuator 96.

Diaphragm 95 has a central portion displaceable by a pressure difference between atmospheric chamber 96a and negative pressure chamber 96b. Drive rod 97 has one end coupled to an atmospheric chamber 96a side of the central portion of diaphragm 95. Drive rod 97 has the other end coupled to WGV 98. A prescribed link mechanism may be provided between the other end of drive rod 97 and WGV 98. An elastic member (not shown) such as a spring is provided on a negative pressure chamber 96b side of the central portion of diaphragm 95 and applies biasing force toward an initial position when the central portion of diaphragm 95 is displaced from the initial position.

A portion communicating with the outside of the housing is provided in any portion of an outer periphery of atmospheric chamber 96a (for example, a portion through which drive rod 97 passes), so that the inside is maintained at the atmospheric pressure.

Negative pressure chamber 96b is coupled to negative pressure tank 92 with negative pressure regulation valve 94 being interposed. By adjusting opening of negative pressure regulation valve 94, a pressure in negative pressure chamber 96b can be regulated.

When a negative pressure is produced in negative pressure chamber 96b and a pressure difference from atmospheric chamber 96a is created, the central portion of diaphragm 95 is displaced toward negative pressure chamber 96b. As the central portion of diaphragm 95 is displaced, drive rod 97 operates in an axial direction to drive WGV 98 to open and close. Then, change to opening of WGV 98 in accordance with magnitude of the negative pressure supplied into negative pressure chamber 96b is made.

As to Configuration of Controller

Figure 3:
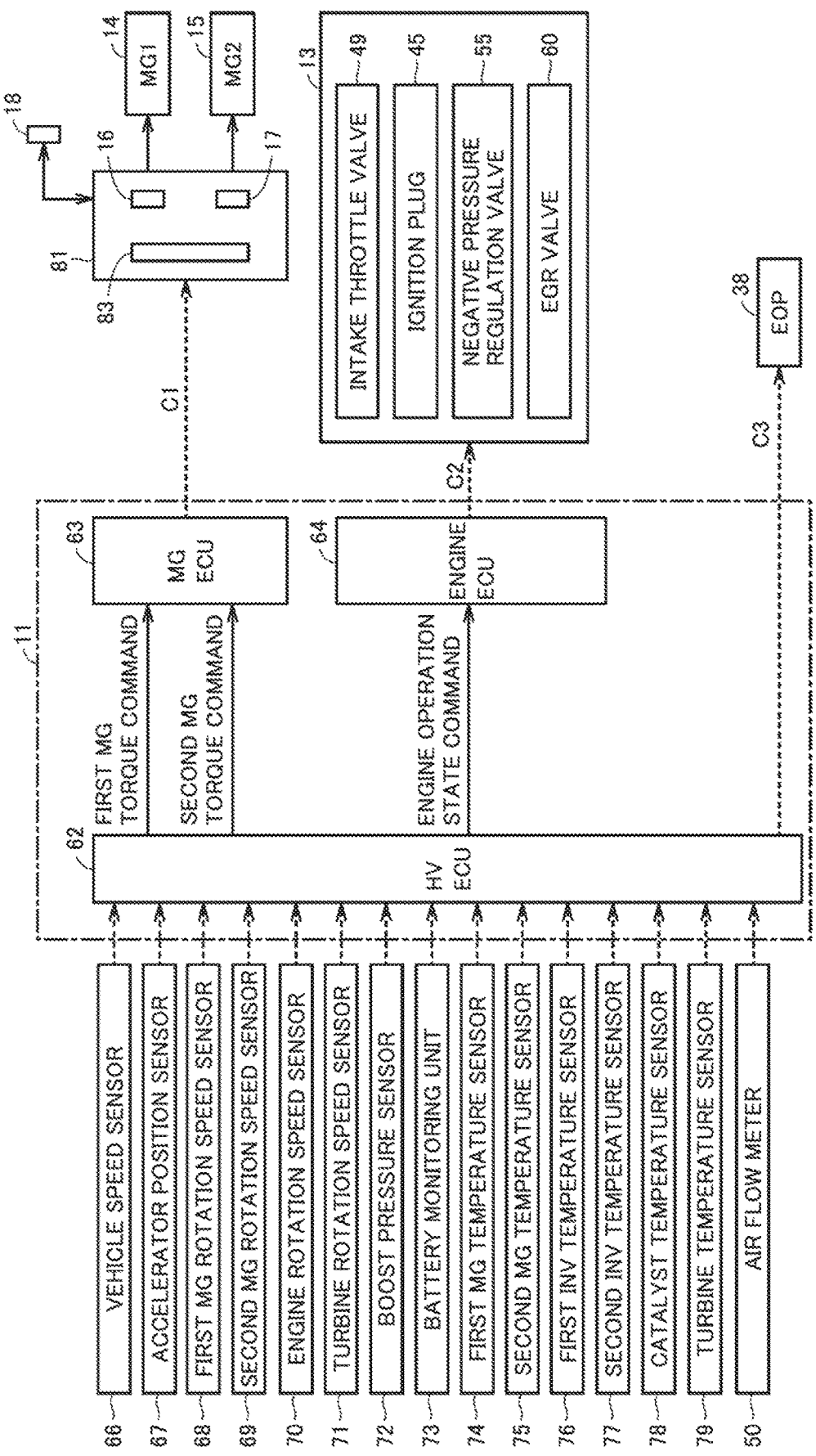
FIG. 3 is a block diagram showing an exemplary configuration of a controller.

FIG. 3 is a block diagram showing an exemplary configuration of controller 11. As shown in FIG. 3, controller 11 includes a hybrid vehicle (HV)-electronic control unit (ECU) 62, an MG-ECU 63, and an engine ECU 64.

HV-ECU 62 is a controller that controls engine 13, first MG 14, and second MG 15 in coordination. MG-ECU 63 is a controller that controls an operation by PCU 81. Engine ECU 64 is a controller that controls an operation by engine 13.

HV-ECU 62, MG-ECU 63, and engine ECU 64 each include an input and output apparatus that supplies and receives signals to and from various sensors and other ECUs that are connected, a storage that serves for storage of various control programs or maps (including a read only memory (ROM) and a random access memory (RAM)), a central processing unit (CPU) that executes a control program, and a counter that counts time.

A vehicle speed sensor 66, an accelerator position sensor 67, a first MG rotation speed sensor 68, a second MG rotation speed sensor 69, an engine rotation speed sensor 70, a turbine rotation speed sensor 71, a boost pressure sensor 72, a battery monitoring unit 73, a first MG temperature sensor 74, a second MG temperature sensor 75, a first INV temperature sensor 76, a second INV temperature sensor 77, a catalyst temperature sensor 78, a turbine temperature sensor 79, and air flow meter 50 are connected to HV-ECU 62.

Vehicle speed sensor 66 detects a speed of vehicle 10 (vehicle speed). Accelerator position sensor 67 detects an amount of pressing of an accelerator pedal (accelerator position). First MG rotation speed sensor 68 detects a rotation speed of first MG 14. Second MG rotation speed sensor 69 detects a rotation speed of second MG 15. Engine rotation speed sensor 70 detects a rotation speed of output shaft 22 of engine 13 (engine rotation speed). Turbine rotation speed sensor 71 detects a rotation speed of turbine 53 of turbo charger 47. Boost pressure sensor 72 detects a boost pressure of engine 13. First MG temperature sensor 74 detects an internal temperature of first MG 14 such as a temperature associated with a coil or a magnet. Second MG temperature sensor 75 detects an internal temperature of second MG 15 such as a temperature associated with a coil or a magnet. First INV temperature sensor 76 detects a temperature of first inverter 16 such as a temperature associated with a switching element. Second INV temperature sensor 77 detects a temperature of second inverter 17 such as a temperature associated with a switching element. Catalyst temperature sensor 78 detects a temperature of aftertreatment apparatus 57. Turbine temperature sensor 79 detects a temperature of turbine 53. Various sensors output signals indicating results of detection to HV-ECU 62.

Battery monitoring unit 73 obtains a state of charge (SOC) representing a ratio of a remaining amount of charge to a full charge capacity of battery 18 and outputs a signal indicating the obtained SOC to HV-ECU 62.

Battery monitoring unit 73 includes, for example, a sensor that detects a current, a voltage, and a temperature of battery 18. Battery monitoring unit 73 obtains an SOC by calculating the SOC based on the detected current, voltage, and temperature of battery 18.

Various known approaches such as an approach by accumulation of current values (coulomb counting) or an approach by estimation of an open circuit voltage (OCV) can be adopted as a method of calculating an SOC.

As to Control of Running of Vehicle

Vehicle 10 configured as above can be set or switched to such a running mode as a hybrid (HV) running mode in which engine 13 and second MG 15 serve as motive power sources and an electric (EV) running mode in which the vehicle runs with engine 13 remaining stopped and second MG 15 being driven by electric power stored in battery 18. Setting of and switching to each mode is made by HV-ECU

62. HV-ECU 62 carries out running control to control engine 13, first MG 14, and second MG 15 based on the set or switched running mode.

The EV running mode is selected, for example, in a low-load operation region where a vehicle speed is low and requested driving force is low, and refers to a running mode in which an operation by engine 13 is stopped and second MG 15 outputs driving force.

The HV running mode is selected in a high-load operation region where a vehicle speed is high and requested driving force is high, and refers to a running mode in which combined torque of drive torque of engine 13 and drive torque of second MG 15 is output.

In the HV running mode, in transmitting drive torque output from engine 13 to drive wheel 24, first MG 14 applies reaction force to planetary gear mechanism 20. Therefore, sun gear S functions as a reaction force element. In other words, in order to apply engine torque to drive wheel 24, first MG 14 is controlled to output reaction torque against engine torque. In this case, regenerative control in which first MG 14 functions as a generator can be carried out.

Control of engine 13, first MG 14, and second MG 15 in coordination while vehicle 10 operates will be described below.

HV-ECU 62 calculates requested driving force based on an accelerator position determined by an amount of pressing of the accelerator pedal. HV-ECU 62 calculates requested running power of vehicle 10 based on the calculated requested driving force and a vehicle speed. HV-ECU 62 calculates a value resulting from addition of requested charging and discharging power of battery 18 to requested running power as requested system power. Requested charging and discharging power of battery 18 is set, for example, in accordance with a difference from an SOC of battery 18 and a predetermined control central value.

HV-ECU 62 determines whether or not activation of engine 13 has been requested in accordance with calculated requested system power. HV-ECU 62 determines that activation of engine 13 has been requested, for example, when requested system power exceeds a threshold value. When activation of engine 13 has been requested, HV-ECU 62 sets the HV running mode as the running mode. When activation of engine 13 has not been requested, HV-ECU 62 sets the EV running mode as the running mode.

When activation of engine 13 has been requested (that is, when the HV running mode is set), HV-ECU 62 calculates power requested of engine 13 (which is denoted as requested engine power below). For example, HV-ECU 62 calculates requested system power as requested engine power. For example, when requested system power exceeds an upper limit value of requested engine power, HV-ECU 62 calculates the upper limit value of requested engine power as requested engine power. HV-ECU 62 outputs calculated requested engine power as an engine operation state command to engine ECU 64.

Engine ECU 64 transmits a control signal C2 based on the engine operation state command input from HV-ECU 62 and variously controls each component of engine 13 such as intake throttle valve 49, ignition plug 45, negative pressure regulation valve 94, and EGR valve 60.

HV-ECU 62 sets based on calculated requested engine power, an operating point of engine 13 in a coordinate system defined by an engine rotation speed and engine torque. HV-ECU 62 sets, for example, an intersection between an equal power line equal in output to requested engine power in the coordinate system and a predetermined operating line as the operating point of engine 13.

The predetermined operating line represents a trace of variation in engine torque with variation in engine rotation speed in the coordinate system, and it is set, for example, by adapting the trace of variation in engine torque high in fuel efficiency through experiments.

HV-ECU 62 sets the engine rotation speed corresponding to the set operating point as a target engine rotation speed.

As the target engine rotation speed is set, HV-ECU 62 sets a torque command value for first MG 14 for setting a current engine rotation speed to the target engine rotation speed. HV-ECU 62 sets the torque command value for first MG 14, for example, through feedback control based on a difference between the current engine rotation speed and the target engine rotation speed.

HV-ECU 62 calculates engine torque to be transmitted to drive wheel 24 based on the set torque command value for first MG 14 and sets a torque command value for second MG 15 so as to fulfill requested driving force. HV-ECU 62 outputs set torque command values for first MG14 and second MG 15 as a first MG torque command and a second MG torque command to MG-ECU 63.

MG-ECU 63 calculates a current value corresponding to torque generated by first MG 14 and second MG 15 and a frequency thereof based on the first MG torque command and the second MG torque command input from HV-ECU 62, and outputs a control signal C1 including the calculated current value and the frequency thereof to PCU 81.

HV-ECU 62 further transmits a control signal C3 based on an operation state including the running mode to EOP 38 and controls drive of EOP 38.

HV-ECU 62 may request increase in boost pressure, for example, when the accelerator position exceeds a threshold value for starting turbo charger 47, when requested engine power exceeds a threshold value, or when engine torque corresponding to the set operating point exceeds a threshold value.

Though FIG. 3 illustrates a configuration in which HV-ECU 62, MG-ECU 63, and engine ECU 64 are separately provided by way of example, the ECUs may be integrated as a single ECU.

As to Negative Pressure Source of WGV

In vehicle 10 described above, WGV 98 that is operated by a negative pressure generated by using an operation of engine 13 is used for regulating a boost pressure of turbo charger 47. For example, when a vacuum pump that generates a negative pressure with motive power of engine 13 is employed as a negative pressure source, however, cost and a mass increase due to increase in number of components, ease in mounting other components may be lessened, and fuel efficiency may be lower. Alternatively, a negative pressure in the air intake pipe of engine 13 may be used as described above, however, a positive pressure may be produced in intake manifold 46 due to increase in boost pressure in engine 13 including turbo charger 47. In such a case, a negative pressure for operating WGV 98 may not be generated.

In the present embodiment, WGV driver 100 configured as described above is provided in vehicle 10, and when stop of engine 13 is requested during running control based on the HV running mode, HV-ECU 62 controls engine 13 to continue a non-forced induction operation state in which forced induction by turbo charger 47 is restricted until a first period elapses before stop of engine 13.

By doing so, forced induction by turbo charger 47 is restricted so that a prescribed negative pressure state can be produced in negative pressure tank 92 by the time engine 13 is stopped. Therefore, even though forced induction by turbo charger 47 is performed after re-start of engine 13, WGV 98 can be activated. Consequently, turbo charger 47 can be set to an appropriate forced induction state. Since a component such as a vacuum pump is not used, increase in cost or weight can be suppressed.

As to Processing Performed by HV-ECU 62

Figure 4:
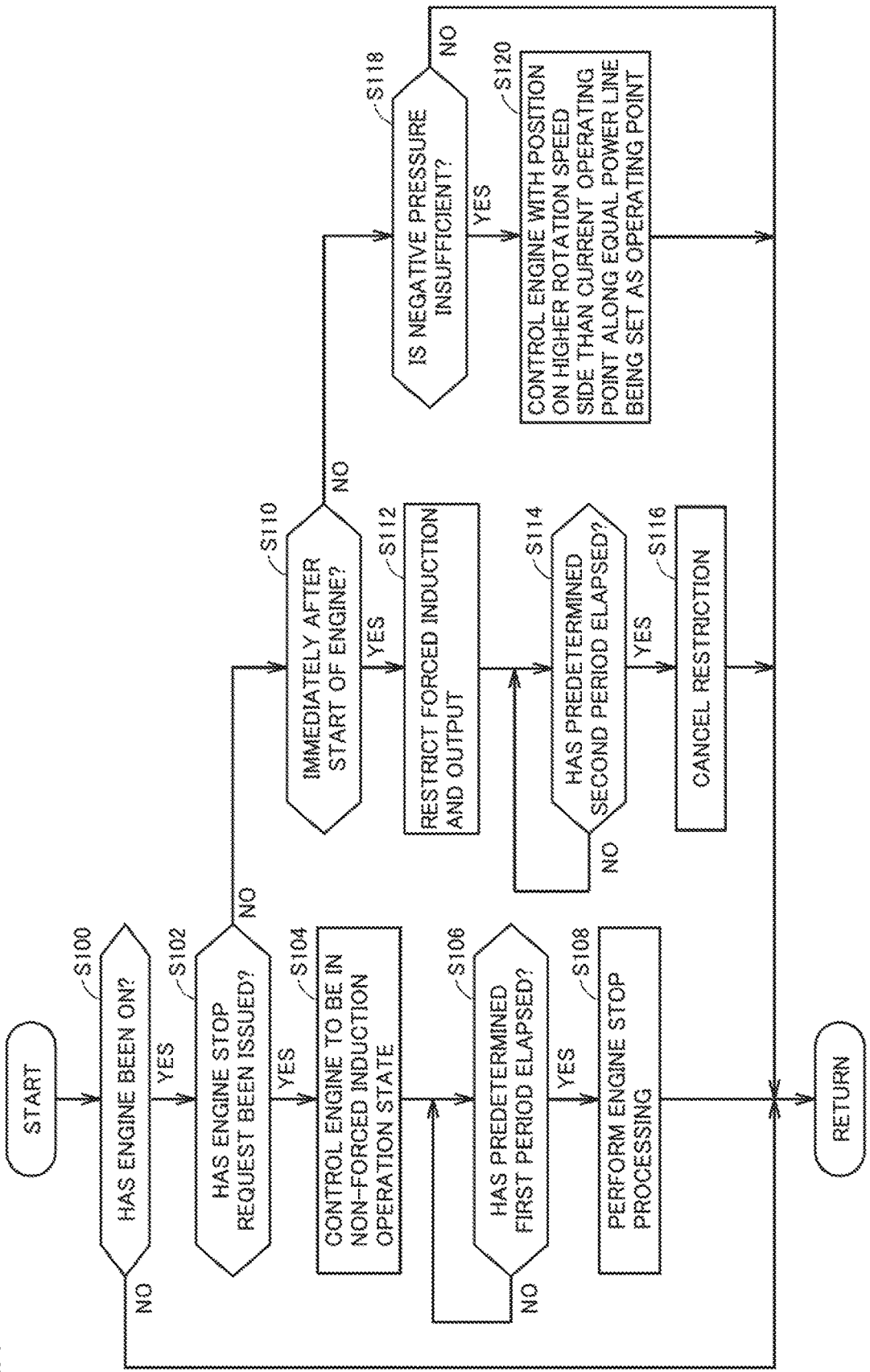
FIG. 4 is a flowchart showing exemplary processing performed by an HV-ECU.

Processing performed by HV-ECU 62 will be described below with reference to FIG. 4. FIG. 4 is a flowchart showing exemplary processing performed by HV-ECU 62.

In a step (a step being denoted as S below) 100, HV-ECU 62 determines whether or not engine 13 has been on. HV-ECU 62 determines whether or not engine 13 has been on, for example, based on whether or not an activation flag of engine 13 is on. HV-ECU 62 turns on the activation flag of engine 13, for example, when engine 13 is started, and stops the activation flag of engine 13 when engine 13 is stopped. When engine 13 is determined as having been on (YES in S100), the process proceeds to S102.

In S102, HV-ECU 62 determines whether or not a request for stop of engine 13 has been issued. Specifically, when requested system power is equal to or smaller than a threshold value, HV-ECU 62 determines that the request for stop of engine 13 has been issued. When it is determined that the request for stop of engine 13 has been issued (YES in S102), the process proceeds to S104.

In S104, HV-ECU 62 controls engine 13 to be in the non-forced induction operation state. For example, HV-ECU 62 transmits to engine ECU 64, an engine operation state command indicating setting of engine 13 to an idle operation state.

In S106, HV-ECU 62 determines whether or not a predetermined first period has elapsed since engine 13 was controlled to be in the non-forced induction operation state. The predetermined first period is set by being adapted through experiments, for example, such that the non-forced induction operation state is continued to produce a prescribed negative pressure state in negative pressure tank 92. The prescribed negative pressure state includes a state that WGV 98 can be active for a prescribed period. When the predetermined first period is determined as having elapsed (YES in S106), the process proceeds to S108.

In S108, HV-ECU 62 performs engine stop processing. For example, HV-ECU 62 transmits an engine operation state command indicating stop of the engine to engine ECU 64.

When the engine is determined as not having been on (NO in S100), the process ends. When it is determined that an engine stop request has not been issued (NO in S102), the process proceeds to S110. When it is determined that the predetermined first period has not elapsed since engine 13 was controlled to be in the non-forced induction operation state (NO in S106), the process returns to S106.

In S110, HV-ECU 62 determines whether or not the current time point is immediately after start of the engine. HV-ECU 62 determines that the current time point is immediately after start of the engine, for example, when a prescribed period has not elapsed since processing for starting engine 13 was performed. When it is determined that the current time point is immediately after start of the engine (YES in S110), the process proceeds to S112.

In S112, HV-ECU 62 restricts forced induction and output. Specifically, HV-ECU 62 performs, for example, forced induction restriction processing for opening WGV 98 to at least threshold opening and performs, for example, output restriction processing for restricting output from engine 13. The threshold opening is set, for example, to produce a negative pressure in intake manifold 46. The output restriction processing includes, for example, processing for changing an upper limit value of engine torque from an initial value to a value lower than a lower limit value of a range of engine torque in which forced induction by turbo charger 47 is performed.

In S114, HV-ECU 62 determines whether or not a predetermined second period has elapsed since restriction of forced induction and output. The predetermined second period is set by being adapted through experiments, for example, such that a prescribed negative pressure state can be produced in negative pressure tank 92 by continuation of restriction of forced induction and output. When the predetermined second period is determined as having elapsed (YES in S114), the process proceeds to S116.

In S116, HV-ECU 62 cancels restriction of forced induction and output. Specifically, HV-ECU 62 sets opening of WGV 98 based on the operation state of engine 13 and controls opening of negative pressure regulation valve 94 to the set opening. HV-ECU 62 sets the upper limit value of engine torque back to the initial value. When it is determined that the current time point is not immediately after start of the engine (NO in S110), the process proceeds to S118. When the predetermined second period is determined as not having elapsed (NO in S114), the process returns to S114.

In S118, HV-ECU 62 determines whether or not negative pressure tank 92 is in a negative pressure insufficient state. For example, when a duration of operation of engine 13 has exceeded a prescribed period without engine 13 entering the non-forced induction operation state, HV-ECU 62 may determine that negative pressure tank 92 is in the negative pressure insufficient state. Alternatively, for example, when a duration for which negative pressure actuator 96 has been active exceeds a prescribed period without engine 13 entering the non-forced induction operation state, HV-ECU 62 may determine that negative pressure tank 92 is in the negative pressure insufficient state. When negative pressure tank 92 is determined as being in the negative pressure insufficient state (YES in S118), the process proceeds to S120.

In S120, HV-ECU 62 controls engine 13 with a position on the higher rotation speed side than the current operating point along the equal power line being set as the operating point. Specifically, HV-ECU 62 controls engine 13 with a position moved toward the higher rotation speed side (that is, a lower torque side) by a predetermined value than a position representing a current operating point on a coordinate plane of engine torque and the engine rotation speed being set as the operating point while output is equal. When the negative pressure tank is determined as not being in the negative pressure insufficient state (NO in S118), the process ends.

As to Exemplary Operation by HV-ECU 62

An operation by HV-ECU 62 according to the present embodiment based on the structure and the flowchart as set forth above will be described.

For example, when it is determined that a request for stop of engine 13 has been issued (YES in S102) based on requested system power being equal to or lower than a threshold value while engine 13 has been on (YES in S100), engine 13 is controlled to be in the non-forced induction operation state (S104). In such a case, when engine 13 is controlled to enter an idle state, forced induction by turbo charger 47 is restricted and hence a negative pressure state is produced in intake manifold 46. Therefore, check valve 90 is opened and a negative pressure is supplied into negative pressure tank 92.

When the predetermined period has elapsed since start of control to the non-forced induction operation state (YES in S106), processing for stopping engine 13 is performed (S108). By this time, a prescribed negative pressure state is produced in negative pressure tank 92. Therefore, a boost pressure can appropriately be controlled by driving WGV 98 with the negative pressure in negative pressure tank 92 after re-start of engine 13.

When the request for stop of engine 13 has not been issued (NO in S102) while engine 13 has been on (YES in S100) and when the current time point is immediately after start of engine 13 (YES in S110), forced induction and output are restricted (S112). Since forced induction by turbo charger 47 is restricted as forced induction and output are restricted, a negative pressure state is produced in intake manifold 46. Therefore, check valve 90 is opened and a negative pressure is supplied to negative pressure tank 92.

When the predetermined second period has elapsed since start of restriction of forced induction and output (YES in S114), restriction of forced induction and output is canceled (S116). When a prescribed negative pressure state in which WGV 98 can be driven is produced in negative pressure tank 92, a boost pressure can appropriately be controlled by driving WGV 98 with the negative pressure in negative pressure tank 92 after lapse of the predetermined second period since start of engine 13.

When the request for stop of engine 13 has not been issued (NO in S102) while engine 13 has been on (YES in S100), when the current time point is not immediately after start of engine 13 (NO in S110), and when a duration of operation of engine 13 exceeds a prescribed period without engine 13 entering the non-forced induction operation state, it is determined that negative pressure tank 92 is in the negative pressure insufficient state (YES in S118). Therefore, engine 13 is controlled with a position on the higher rotation speed side by a predetermined value along the equal power line than the position indicating the current operating point on the coordinate plane of engine torque and the engine rotation speed being set as the operating point (S120).

Figure 5:
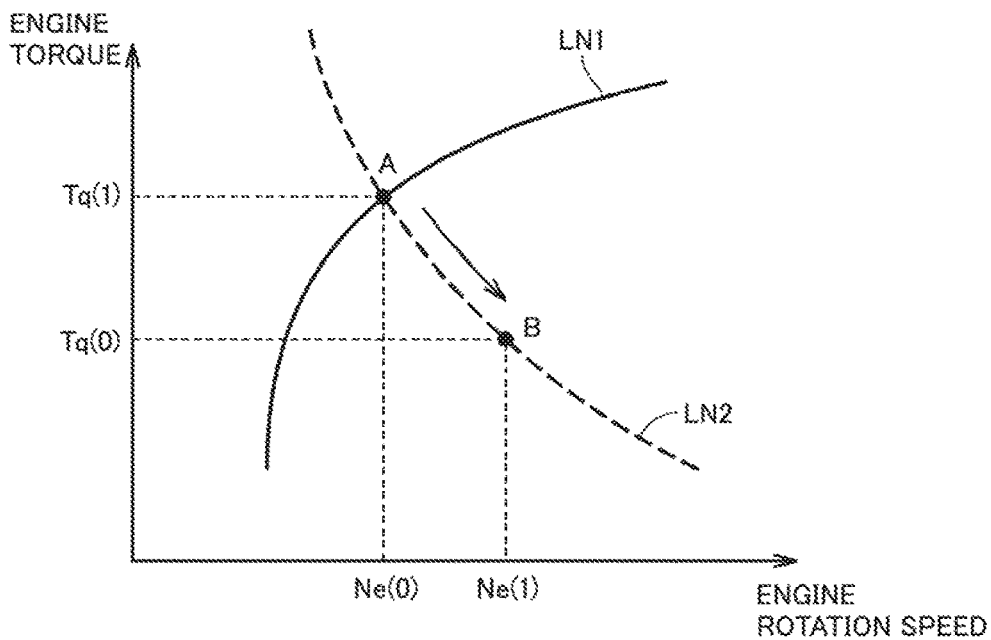
FIG. 5 is a diagram for illustrating an exemplary operation by the HV-ECU.

FIG. 5 is a diagram for illustrating an exemplary operation by HV-ECU 62. The ordinate in FIG. 5 represents engine torque. The abscissa in FIG. 5 represents an engine rotation speed. FIG. 5 shows a predetermined operating line LN1 (a solid line). FIG. 5 shows an equal power line of (exemplary) requested engine power LN2 (a dashed line). Requested system power is assumed to be constant for the sake of convenience of description.

As shown in FIG. 5, for instance, an example in which an intersection A between the predetermined operating line (LN1 in FIG. 5) and the equal power line (LN2 in FIG. 5) of requested engine power is set as the current operating point is assumed. At intersection A, the engine rotation speed attains to Ne(0) and engine torque attains to Tq(1). When negative pressure tank 92 enters the negative pressure insufficient state, a point B on the higher rotation speed side than intersection A along the equal power line (LN2 in FIG. 5) is set as a new operating point. At point B, the engine rotation speed attains to Ne(1) higher by a predetermined value than Ne(0) and engine torque attains to Tq(0) lower than Tq(1). Since forced induction by turbo charger 47 is restricted due to change in engine torque to a value on the lower torque side, the negative pressure state is produced in intake manifold 46. Therefore, check valve 90 is opened and a negative pressure is supplied to negative pressure tank 92.

As to Function and Effect

As set forth above, according to the hybrid vehicle in the present embodiment, by restricting forced induction by turbo charger 47, a prescribed negative pressure state can be produced in negative pressure tank 92 by the time of stop of engine 13. Therefore, WGV 98 can be activated also when forced induction by turbo charger 47 is performed after re-start of engine 13. Consequently, turbo charger 47 can be set to an appropriate forced induction state. Since a component such as a vacuum pump is not used, increase in cost or weight can be suppressed. Therefore, a hybrid vehicle that ensures a negative pressure for operating a negative-pressure-driven waste gate valve at appropriate timing while increase in cost or weight is suppressed and a method of controlling a hybrid vehicle can be provided.

The non-forced induction operation state is continued until the predetermined second period elapses since start of engine 13. Therefore, a prescribed negative pressure state can be produced in negative pressure tank 92. Therefore, WGV 98 can be activated also when forced induction by turbo charger 47 is thereafter performed. Turbo charger 47 can thus be set to an appropriate forced induction state.

For negative pressure tank 92 to enter the negative pressure insufficient state, an operating point is changed toward the higher rotation speed side along the equal power line of requested engine power than a position representing the current operating point on the coordinate plane of engine torque and the engine rotation speed. Therefore, engine torque is lowered and forced induction by turbo charger 47 is restricted. Engine 13 is thus set to a normal aspiration state and a negative pressure can be produced in intake manifold 46. A negative pressure can thus be supplied to negative pressure tank 92 from intake manifold 46. Furthermore, deterioration in drivability of vehicle 10 can be suppressed by maintaining requested engine power.

As to Modification

A modification will be described below.

Though intake throttle valve 49 is described as being provided between intercooler 51 and intake manifold 46 in the embodiment above, it may be provided, for example, in intake air passage 41 between compressor 48 and air flow meter 50.

Though a vehicle in which engine 13, first MG 14, and output gear 21 are coupled to one another by planetary gear mechanism 20 and motive power of engine 13 and motive power of second MG 15 can be transmitted drive wheel 24 is described by way of example of the hybrid vehicle in the embodiment above, limitation to such a configuration is not particularly intended. The hybrid vehicle should only be a vehicle that includes engine 13 including turbo charger 47 and being capable of transmitting motive power to drive wheel 24 and a motor generator for driving capable of transmitting motive power to drive wheel 24 and is capable of selectively carry out first running control under which the vehicle runs using engine 13 and second running control under which the vehicle runs using the motor generator for driving with engine 13 being stopped.

Though a configuration in which intake manifold 46 and negative pressure tank 92 are coupled to each other through first pipe 91 is described by way of example in the embodiment above, for example, the first pipe may be located between compressor 48 and intake manifold 46 in intake air passage 41 and limitation to the configuration in which intake manifold 46 and negative pressure tank 92 are coupled to each other through the first pipe is not particularly intended.

Though an example in which both of forced induction and output are restricted immediately after start of engine 13 is described by way of example in the embodiment above, for example, at least any one of forced induction and output may be restricted. For example, of forced induction and output, only forced induction or only output may be restricted.

An example in which forced induction and output are restricted immediately after start of engine 13 is described by way of example in the embodiment above. When the non-forced induction operation state continues with forced induction and output being restricted, shortage in driving force of vehicle 10 due to continuation of the non-forced induction operation state may be compensated for by second MG 15. Deterioration in drivability of the vehicle can thus be suppressed.

Though the non-forced induction operation state is set by controlling engine 13 to be in an idle operation state before stop of engine 13 when a request for stop of engine 13 has been issued according to the description of the embodiment above, a state that the upper limit value of engine torque is lower than the lower limit value of the range of engine torque in which forced induction by the turbo charger is performed should only be set and restriction to the idle operation state is not particularly intended. HV-ECU 62 may set engine 13 to be in the non-forced induction operation state in which forced induction by turbo charger 47 is restricted, for example, by performing forced induction restriction processing or output restriction processing described above.

When a request for stop of engine 13 has been issued, the non-forced induction operation state is continued until the predetermined first period elapses before stop of engine 13 and forced induction restriction processing and output restriction processing are performed until the predetermined second period elapses also immediately after start of engine 13 according to the description of the embodiment above. For example, however, when the request for stop of engine 13 has been issued, the non-forced induction operation state may be continued until the predetermined first period elapses before stop of engine 13 but neither of forced induction restriction processing and output restriction processing may be performed immediately after start of engine 13.

Figure 6:
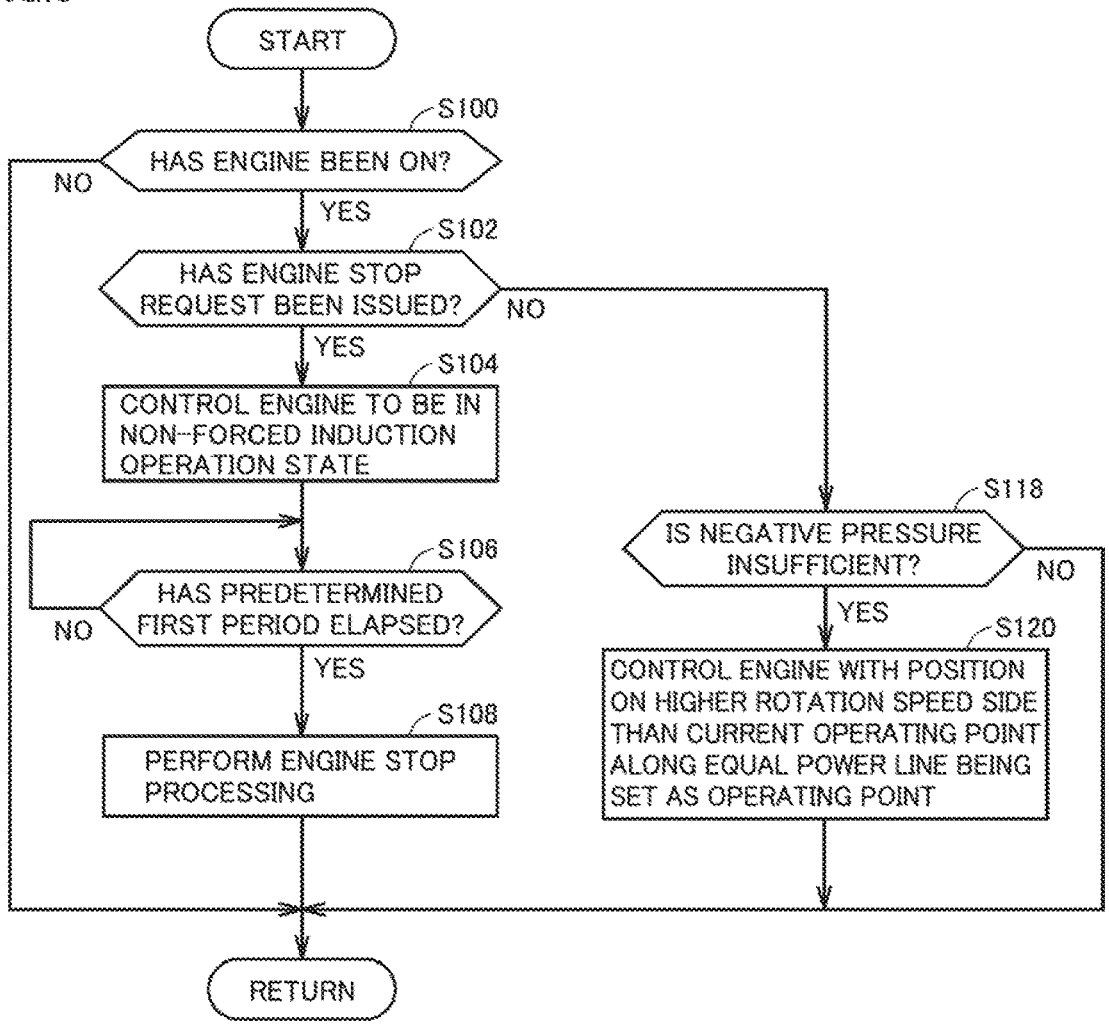
FIG. 6 is a flowchart showing exemplary processing performed by the HV-ECU in a modification.

FIGS. 6 and 7 are flowcharts each showing exemplary processing performed by HV-ECU 62 in this modification.

The process in the flowchart in FIG. 6 is different from the flowchart in FIG. 4 in that processing in S110, S112, S114, and S116 is not performed and the process proceeds to S118 when it is determined that a request for stop of the engine has not been issued (NO in S102). Since the process is otherwise the same as the process illustrated in the flowchart in FIG. 4, detailed description thereof will not be repeated.

The process in the flowchart in FIG. 7 is different from the flowchart in FIG. 4 in that processing in S110, S112, S114, S116, S118, and S120 is not performed and the process ends when it is determined that a request for stop of the engine has not been issued (NO in S102). Since the process is otherwise the same as the process illustrated in the flowchart in FIG. 4, detailed description thereof will not be repeated.

The modification above may be carried out as being combined in its entirety or in part as appropriate.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A hybrid vehicle comprising:
an engine including a turbo charger, the engine transmitting motive power to a drive wheel of the vehicle;
a motor generator for driving that transmits motive power to the drive wheel; and
a controller that selectively carries out first running control and second running control, under the first running control, the vehicle running using the engine, under the second running control, the vehicle running using the motor generator for driving with the engine being stopped,
the engine including
a bypass passage provided in an exhaust passage, through the bypass passage, exhaust flowing by bypassing a turbine of the turbo charger,
a waste gate valve that regulates a flow rate of exhaust in the bypass passage, and
a driver that drives the waste gate valve,
the driver including
a negative pressure tank to which a negative pressure can be supplied from an intake air passage of the engine,
a valve that suppresses a flow of gas from the intake air passage to the negative pressure tank, and
a negative pressure actuator that actuates the waste gate valve with the negative pressure in the negative pressure tank, wherein
when stop of the engine is requested during the first running control, the controller controls the engine to continue a non-forced induction operation state until a first period elapses before stop of the engine, in the non-forced induction operation state, forced induction by the turbo charger is restricted.

2. The hybrid vehicle according to claim 1, wherein
the controller continues the non-forced induction operation state until a second period elapses since start of the engine.

3. The hybrid vehicle according to claim 2, wherein
the controller compensates for shortage in driving force of the vehicle caused by continuation of the non-forced induction operation state, by using the motor generator for driving.

4. The hybrid vehicle according to claim 1, wherein
the non-forced induction operation state includes a state that the waste gate valve is opened to opening equal to or greater than threshold opening.

5. The hybrid vehicle according to claim 1, wherein
the non-forced induction operation state includes a state that an upper limit value of engine torque is lower than a lower limit value of a range of the engine torque, forced induction by the turbo charger being performed in the range.

6. The hybrid vehicle according to claim 1, further comprising:
a motor generator for power generation that generates electric power by using motive power of the engine; and
a power divider that divides motive power output from the engine into motive power to be transmitted to the motor generator for power generation and motive power to be transmitted to the drive wheel, wherein when a negative pressure is insufficient in the negative pressure tank, the controller controls the engine and the motor generator for power generation to change an operating point of the engine toward a higher rotation speed side with output from the engine being maintained and operates the engine at the changed operating point.

7. A method of controlling a hybrid vehicle, the hybrid vehicle including an engine including a turbo charger and a motor generator for driving; the engine transmitting motive power to a drive wheel of the vehicle; the motor generator transmitting motive power to the drive wheel; the engine including a bypass passage provided in an exhaust passage through which exhaust flows by bypassing a turbine of the turbo charger, a waste gate valve that regulates a flow rate of exhaust in the bypass passage, and a driver that drives the waste gate valve; the driver including a negative pressure tank to which a negative pressure can be supplied from an intake air passage of the engine, a valve that suppresses a flow of gas from the intake air passage to the negative pressure tank, and a negative pressure actuator that actuates the waste gate valve with the negative pressure in the negative pressure tank, the method comprising:

selectively carrying out first running control and second running control, under the first running control, the vehicle running using the engine, under the second running control, the vehicle running using the motor generator for driving with the engine being stopped; and controlling, when stop of the engine is requested during the first running control, the engine to continue a non-forced induction operation state until a first period elapses before stop of the engine, forced induction by the turbo charger being restricted in the non-forced induction operation state.

\* \* \* \* \*